(12) United States Patent
Horiguchi et al.

(10) Patent No.: US 7,796,313 B2
(45) Date of Patent: Sep. 14, 2010

(54) HOLOGRAPHIC INFORMATION RECORDING-REPRODUCING PROCESS AND APPARATUS THEREFOR

(75) Inventors: Haruhiko Horiguchi, Tokyo (JP); Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/864,129

(22) Filed: Sep. 28, 2007

(65) Prior Publication Data
US 2008/0084593 A1    Apr. 10, 2008

(30) Foreign Application Priority Data
Oct. 4, 2006  (JP)  ............................ 2006-272942
Oct. 13, 2006 (JP)  ............................ 2006-279940

(51) Int. Cl.
*G03H 1/26*    (2006.01)
*G03H 1/22*    (2006.01)
*G03H 1/04*    (2006.01)

(52) U.S. Cl. .............................. 359/22; 359/32; 359/35
(58) Field of Classification Search ................... 359/32
See application file for complete search history.

(56) References Cited

U.S. PATENT DOCUMENTS 6,721,076 B2 *  4/2004  King et al. .................... 359/35

2004/0165518 A1 *  8/2004  Horimai et al. ............... 369/94

FOREIGN PATENT DOCUMENTS

JP    2006-267803    10/2006

OTHER PUBLICATIONS

Hariharan, Optical Holography Principles, techniques and applications, 1996, Cambridge University Press, Second Edition, 201-204.*

* cited by examiner

*Primary Examiner*—Stephone B Allen
*Assistant Examiner*—Jade R Chwasz
(74) *Attorney, Agent, or Firm*—Fitzpatrick, Cella, Harper & Scinto

(57) ABSTRACT

A process for recording information on and reproducing information from a reflection-type holographic information recording medium, having a reflecting layer. Recording includes (i) branching a light beam from a light source into a first branched light beam and a second branched light beam, (ii) forming an information light beam from the first branched light beam by modulation with a spatial light modulation element, and (iii) recording the information by forming an interference fringe by projecting the second branched light beam as a recording reference light beam together with the information light beam onto the recording medium. Reproducing includes projecting a light beam from the light source as a reproducing reference light beam onto the interference fringe. An angle of incidence of the recording reference light beam and an angle of incidence of the reproducing reference light beam into the interference fringe are one hundred eighty degrees from one another.

3 Claims, 11 Drawing Sheets

HOLOGRAPHIC INFORMATION RECORDING-REPRODUCING PROCESS AND APPARATUS THEREFOR

This application claims the benefit of Japanese Patent Application No. 2006-277942, filed Oct. 4, 2006, and No. 2006-279940, filed Oct. 13, 2006, which are hereby incorporated by reference herein in their entirety.

BACKGROUND OF THE INVENTION

1. Field of the Invention

The present invention relates to a process for recording or reproducing optical information by a holography technique, and a process therefor.

2. Description of the Related Art

Holographic memories are disclosed in various documents, such as Japanese Patent Application Laid-Open No. 2006-267803. The holographic memory technique is described below with reference to FIGS. 9-11B, according to this patent document.

FIG. 9 is a development view for describing a conventional optical system for recording on a holographic memory disk (two-beam interference system). FIG. 10 is a development view for describing a conventional optical system for reproducing the information recorded on a holographic memory disk (two-beam interference system). This holographic memory disk 206 is a transmission type recording medium.

A conventional process for recording information on holographic memory disk 206 is described with reference to FIG. 9 and FIG. 11A. A light beam emitted from laser beam source 201 is converted to a parallel ray beam by collimator 202, and is introduced into beam splitter (BS) 203. This beam splitter (BS) 203 divides the introduced parallel ray beam into a transmitted light beam and a reflected light beam.

The transmitted light beam from beam splitter (BS) 203 penetrates through space light modulation element (SLM) 204 and objective lens 205, successively, and strikes holographic memory disk 206, as information light beam 212.

On the other hand, the reflected light beam from beam splitter (BS) 203 is further reflected by mirror 209. The reflected light beam from mirror 209 strikes holographic memory disk 206 as reference light beam 203.

FIG. 11A illustrates information light beam 212 and reference light beam 213 introduced into holographic memory disk 206. In recording layer 215 in holographic memory disk 206, information light beam 212 and reference light beam 213 interfere with each other, and an interference fringe 217, which is formed, is recorded as a refractive index distribution, to form a digital volume hologram. Multiple recordings can be made by changing the angle of incidence of projection of reference light beam 213 onto holographic memory disk 206, by adjusting the controlling mirror 209.

Next, a conventional process for reproducing the information recorded in holographic memory disk 206 is described below, with reference to FIG. 10 and FIG. 11B. A light beam emitted from laser beam source 201 is converted into a parallel ray beam by collimator 202 in the same manner as in the recording operation, and is introduced into beam splitter (BS) 203. This beam splitter (BS) 203 divides the introduced parallel ray beam into a transmitted light beam and a reflected light beam. The reflected light beam is further reflected by mirror 209, as reference light beam 213, to holographic memory disk 206.

In the information reproduction, the light beam transmitted through beam splitter (BS) 203 is intercepted by space-light modulation element (SLM) 204, not to reach holographic memory disk 206 through objective lens 205.

FIG. 11B illustrates reference light beam 213 introduced to holographic memory disk 206. Reproduced light beam 218 is generated by projection of reference light beam 213 to interference fringe 217 at the same angle of incidence as in the recording operation.

This reproduced light beam 218 is emitted from holographic memory disk 206 and travels through lens 210 to light-receiving element 211, to form an image thereon. The recorded information is reproduced from the output from light-receiving element 211. Further, reference light beam 213 is projected by controlling mirror 209 at another projection angle, which is the same as that of reference light beam 213 in the recording operation, to reproduce the intended information.

In the above conventional technique, the recording is made on a transmission type holographic memory disk 206. In information reproduction from transmission type holographic memory disk 206, reproduced light beam 218 is emitted from the face of holographic memory disk 206, reverse to the introduction of the reference light 213, and the reproduced light beam 218 is received by light-receiving element 211 of the optical system placed on the reverse side of holographic memory disk 206. Therefore, the apparatus inevitably has a large thickness (large height). This is disadvantageous.

SUMMARY OF THE INVENTION

The present invention intends to provide a holographic information recording-reproducing apparatus having a low profile, by use of a reflection type hologram recording medium, and placing all of the optical system components on the light beam projection side of the recording medium.

The present invention is directed to a process for recording of holographic information and for reproduction of holographic information. The recording method includes the steps of branching a light beam from a light source into a first branched light beam and a second branched light beam, forming an information light beam from the first branched light beam by modulation with a spatial light modulation element, and recording the information by interference fringe formation, by projecting the second branched light beam as a recording reference light beam onto a reflection type recording medium comprised of a reflecting layer. The reproduction method includes the step of projecting a light beam from the light source, as a reproducing reference light beam, onto the interference fringe, wherein the recording reference light beam and the reproducing reference light beam are projected to the interference fringe at their respective incidence angles, the same value to each other, but in their respective directions exactly reverse to each other.

The recording reference light beam can be reflected by the reflective layer after forming the interference fringe, and the interference fringe is irradiated with the reproducing reference light beam reflected by the reflective layer.

The recording reference light beam can be reflected by the reflective layer and then interferes with the information light beam, to form the interference fringe, and the reproducing reference light beam is reflected by the reflective layer after passing through the interference fringe.

The present invention is also directed to a holographic information recording-reproducing apparatus comprising a light source, at least one branching element for branching the light beam from the light source, a spatial light modulation element for forming an information light beam from the light beam passing through the branching element, an objective lens for projecting the information light beam onto a reflection type recording medium, a first movable mirror for adjusting the path of a recording reference light beam reflected by the branching element, and a second movable mirror for adjusting the path of a reproducing reference light beam reflected by the branching element, wherein the light source, the branching element, the spatial light modulation element, the objective lens, the first movable mirror, and the second movable mirror are placed on the same side of the reflection type recording medium.

The spatial light modulation element can be capable of intercepting the information light beam.

In the holographic information recording-reproducing apparatus, a light-intercepting element can be placed between the branching element and the objective lens.

The branching element can be capable of branching the light beam from the light source into two branched light beams, and two of the branching elements are provided between the light source and the spatial light modulation element. In the holographic information recording-reproducing apparatus, a first light-intercepting element can be provided between the branching element and the first movable mirror or between the first movable mirror and the reflection type recording medium, to intercept the recording reference light beam from reaching the reflection type recording medium, and a second light-intercepting element is provided between the branching element and the second movable mirror, or between the second movable mirror and the reflection type recording medium, to intercept the reproducing reference light beam from reaching the reflection type recording medium.

The branching element can be a cross-prism, which is capable of branching the light beam from the light source into three branched light beams. In the holographic information recording-reproducing apparatus, a first light-intercepting element can be provided between the branching element and the first movable mirror, or between the first movable mirror and the reflection type recording medium, to intercept the recording reference light beam from reaching the reflection type recording medium, and a second light-intercepting element is provided between the branching element and the second movable mirror, or between the second movable mirror and the reflection type recording medium, to intercept the reproducing reference light beam from reaching the reflection type recording medium.

Further features of the present invention will become apparent from the following description of exemplary embodiments, with reference to the attached drawings.

DESCRIPTION OF THE EMBODIMENTS

Best modes of the present invention are described below in detail with reference to the drawings.

First Embodiment

Figure 1:
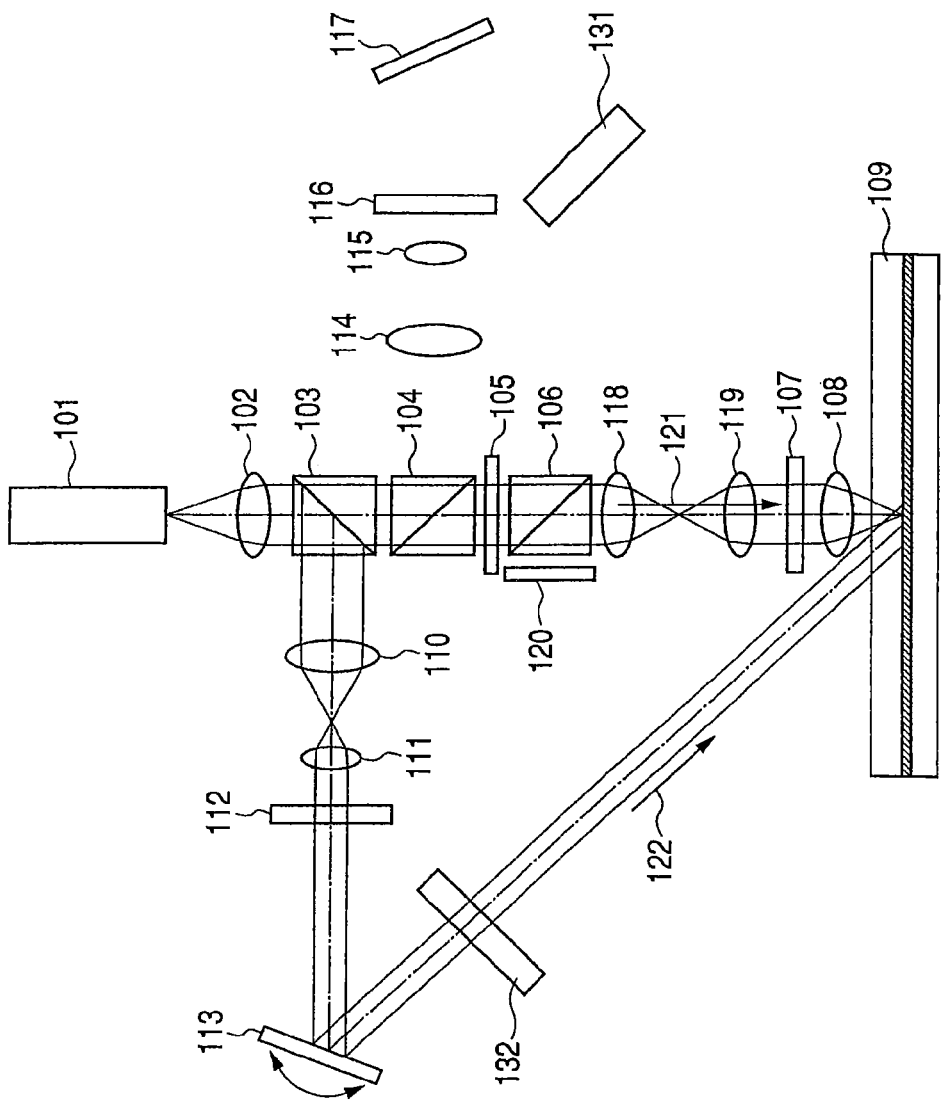
FIG. 1 schematically illustrates the optical system in information recording in a First Embodiment of the present invention.
Figure 2:
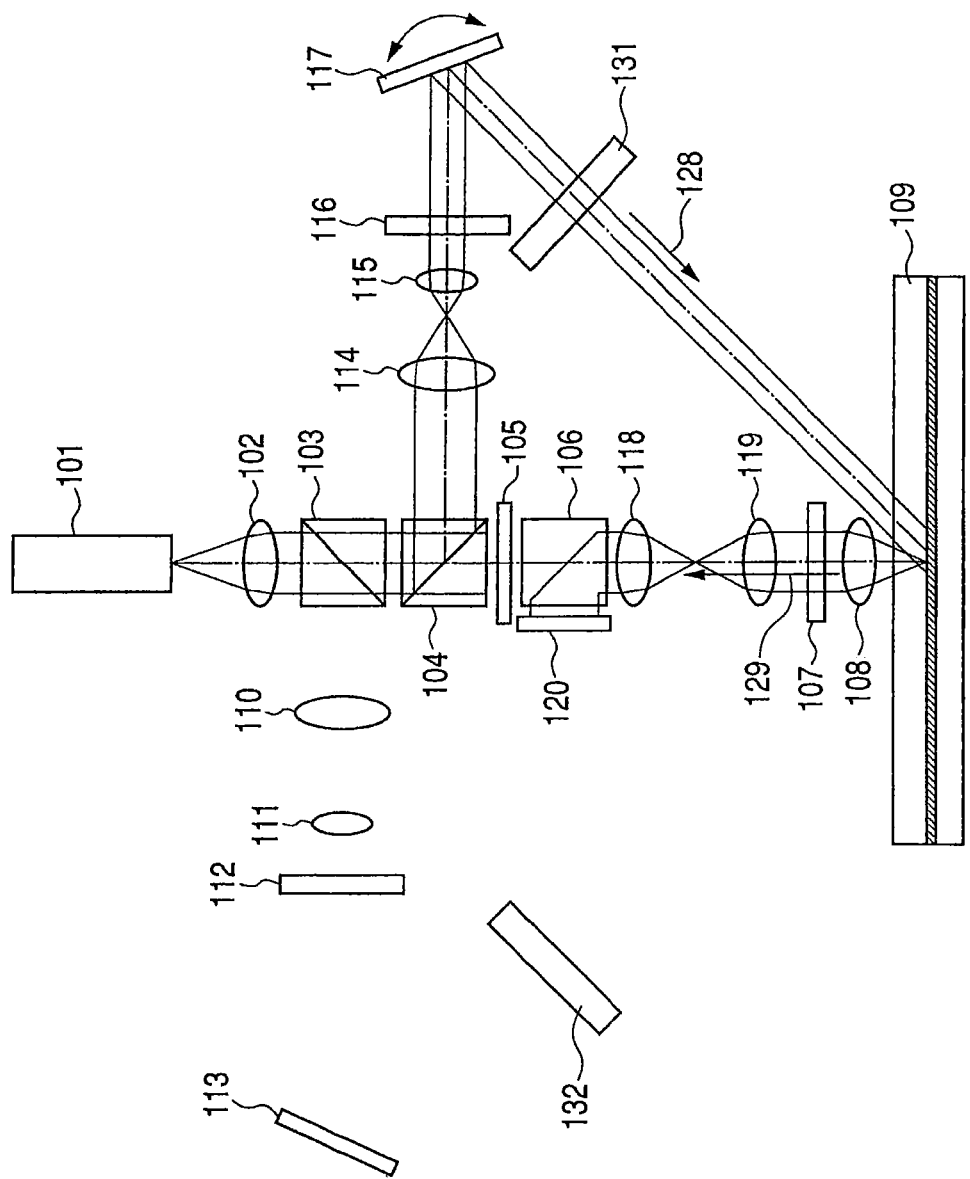
FIG. 2 schematically illustrates the optical system in information reproduction in the First Embodiment of the present invention.

FIG. 1 and FIG. 2 illustrate a constitution of a First Embodiment of the holographic information recording-reproducing apparatus of the present invention. FIG. 1 is a developmental drawing illustrating the optical system for recording. FIG. 2 is a developmental drawing illustrating the optical system for reproduction. In this Embodiment, the optical information recording-reproducing operation is conducted by a two-beam interference system.

FIG. 1 illustrates the constitution of the optical system, without illustrating the circuits for recording or reproducing information on or from the holographic memory disk, and the circuit and mechanism for rotating the holographic memory disk.

Figure 3A:
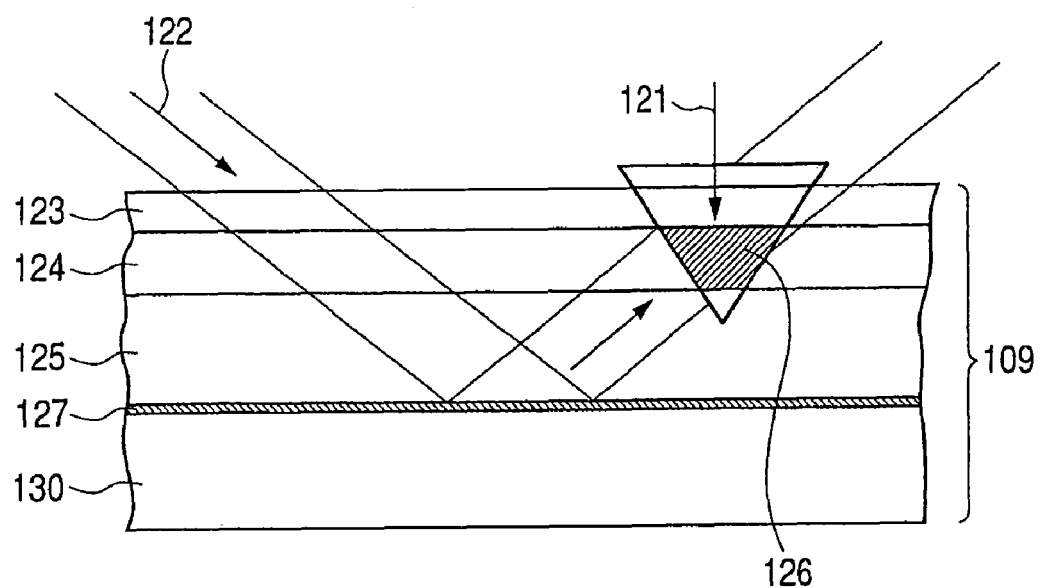
FIG. 3A and FIG. 3B illustrate the process of recording-reproduction in the First Embodiment of the present invention.

First, a process is described of recording with the holographic information recording-reproducing apparatus of the present invention, with reference to FIG. 1 and FIG. 3A.

In FIG. 1, the light beam emitted from laser beam source 101 is converted to a parallel ray beam by collimator 102, and is introduced to beam splitter (BS) 103. A part of the light beam introduced to beam splitter 103 penetrates the beam splitter, whereas the other part thereof is reflected by the beam splitter. The part of the light beam, after passage through beam splitter (BS) 103, is introduced to second beam splitter (BS) 104. A part of the introduced light is allowed to pass through the beam splitter 104, to irradiate spatial light modulation element (SLM) 105.

The light beam, after penetration through spatial light modulation element (SLM) 105, passes through polarized light beam splitter (PBS) 106, relay lens-(5) 118, and relay lens-(6) 119, and strikes quarter wavelength plate (QWP) 107.

The light beam is converted into circulation polarized light (e.g., dextrorotary circular polarized light) by passage through quarter wavelength plate (QWP) 107, and is projected as an information light beam through objective lens 108 onto holographic memory disk 109. This holographic memory disk 109 is a reflection type recording medium having a reflective layer as described later.

On the other hand, the light beam reflected by beam splitter (BS) 103 is introduced through relay lens-(1) 110 and relay lens-(2) 111, to quarter wavelength plate (QWP) 112. The light beam is converted by the quarter wavelength plate (QWP) 112 into a circular polarized light beam (e.g., dextrorotary circular polarized light), and is reflected by mirror 113 as recording reference light beam 122, onto holographic memory disk 109.

As illustrated in FIG. 3A, information light beam 121 and recording reference light beam 122 are both introduced into holographic memory disk 109, and interfere with each other to form interference fringe 126. Further, other information can be recorded by a so-called multi-angle recording system by introducing the recording reference light beam 122 at a different incidence angle, by driving mirror 113, onto the interference fringe formation site of holographic memory disk 109.

The formed interference fringe pattern is recorded as a refractive index distribution in polymer material (recording layer) 124 of holographic memory disk 109, to form a digital volume hologram. This holographic memory disk 109 has a reflective layer (reflective layer) 127.

Shutter 131 is placed in the optical path between beam splitter (BS) 104 and mirror 117, or between mirror 117 and holographic memory disk 109. In a recording operation, this shutter 131 intercepts the light beam reflected by beam splitter (BS) 104, not to reach holographic memory disk 109. The type of the shutter is not limited insofar as it is capable of intercepting the light beam. Otherwise, the shutter may be omitted, when the angle of mirror 117 can be adjusted, to deflect the reflected light beam from beam splitter (BS), not to irradiate the interference fringe pattern.

FIG. 3A illustrates in detail a light beam introduced to, and emitted from, holographic memory disk 109 to perform the recording on holographic memory disk 109 shown in FIG. 1. Holographic memory disk 109 is constituted of cover layer 123, recording layer 124, spacer layer 125, and reflective layer 127. Spacer layer 125 need not be provided. Without the spacer layer 125, reflective layer 127 is placed in direct contact with recording layer 124.

In information recording on holographic memory disk 109, information light beam 121 penetrates cover layer 123 of holographic memory disk 109, and reaches recording layer 124, while recording reference light beam 122 is projected from the upper left side in FIG. 3A to holographic memory disk 109, penetrates cover layer 123, recording layer 124, and spacer layer 125, and is reflected by reflective layer 127.

Recording reference light beam 122, reflected from reflective layer 127, penetrates spacer layer 125 and reaches recording layer 124. Recording light beam 121 and recording reference light beam 122 interfere with each other in recording layer 124, to form interference fringe 126, to record the information. Further, multiple recording can be conducted by changing the angle of incidence of reference light beam 122, by adjustment of mirror 113.

Figure 3B:
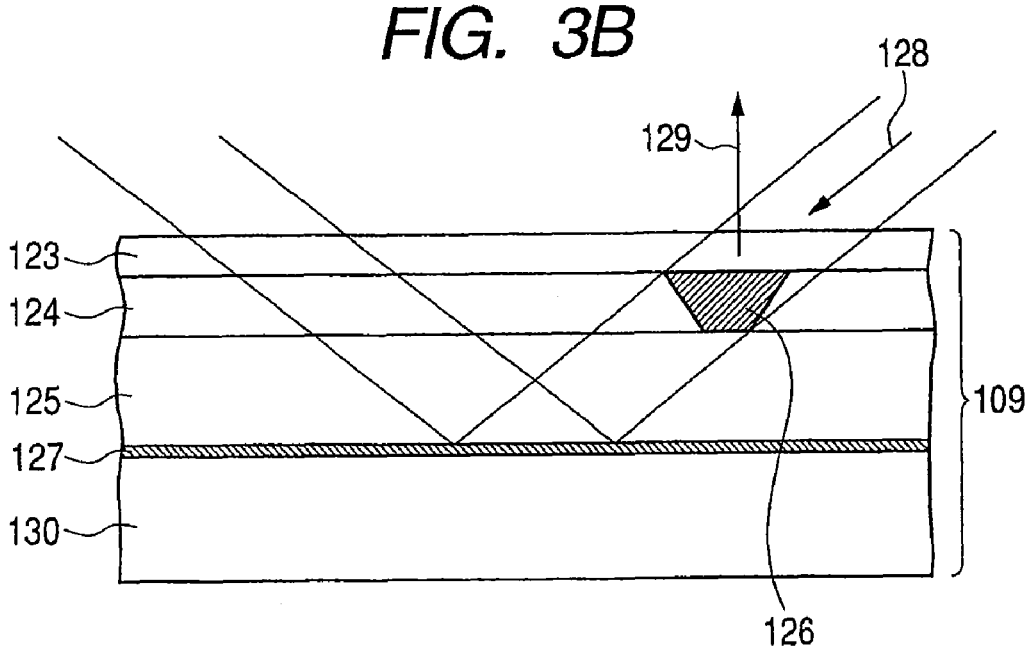

Next, a method is described for reproducing information with the holographic information recording-reproducing apparatus of the present invention, with reference to FIG. 2 and FIG. 3B.

In FIG. 2, the light beam emitted from laser 101, as the light source, is converted into a parallel ray beam by collimator 102, and is introduced to beam splitter (BS) 103. A part of the light introduced to beam splitter (BS) 103 penetrates the beam splitter to enter another beam splitter (BS) 104, and the other part thereof reflects from the beam splitter to travel through relay lens 114, and relay lens 115 to quarter wavelength plate (QWP) 116.

The light beam is converted into a parallel ray beam by quarter wavelength plate (QWP) 116, and is reflected by mirror 117, as reproducing reference light beam 128, for reproduction, to holographic memory disk 109.

FIG. 3B illustrates in detail a light beam introduced for reproduction of information from holographic memory disk 109, illustrated in FIG. 2. The reproducing reference light beam 128 is introduced from the right top side in FIG. 3B into holographic memory disk 109, and is allowed to penetrate cover layer 123 and to irradiate interference fringe 126 formed in recording layer 124.

Reproduced light beam 129 is emitted when the interference fringe 126 carrying the information is irradiated by reproducing reference light beam 128 at a specified projection angle. Reproducing reference light beam 128, which is reflected by reflective layer 127, is introduced to interference fringe 126 in the recording layer in the direction exactly reverse to the projection direction of recording reference light beam 122 in FIG. 3A. That is, the reproducing reference light beam is introduced at an angle of 180° to that of recording reference light beam 122. Thereby, noise can be decreased, which may be generated when the recording reference light beam 122 and reproducing reference light beam 128 are introduced in the same direction. The optical axis of reproducing reference light beam 128 preferably coincides with the optical axis of recording reference light beam 122. However, even when the axes do not coincide precisely, the reproduction can be conducted with the light beam having the beam diameter sufficient for irradiating the interference fringe. Reproduced light beam 129 is emitted through cover layer 123 outside the holographic memory disk 109.

Again, with reference to FIG. 2, the behavior of reproduced light beam 129 is described in image formation on light-receiving element 120. Reproduced light beam 129 emitted from holographic memory disk 109 penetrates objective lens 108, quarter wavelength plate (QWP) 107, relay lens 119, and relay lens 118, to strike polarizing beam splitter (PBS) 106. The polarization state is rotated by passage through quarter wavelength plate (QWP) 107. Reproduced light beam 129, reflected by polarizing beam splitter (PBS) 106, forms an image on light-receiving element 120 for reproduction of the information.

The information can be reproduced from multiple records in holographic memory disk 109 by projecting reproducing reference light beam 128 to interference fringe 126 in the direction precisely reverse to the recording reference light beam 122, at the incidence angles corresponding to that of the recording reference light beam, by control of mirror 117.

Shutter 132 is placed in the optical path between beam splitter (BS) 103 and mirror 113, or between mirror 113 and holographic memory disk 109. In a reproduction operation, this shutter 132 is employed to intercept the light beam reflected by beam splitter (BS) 103, not to reach holographic memory disk 109. The type of the shutter is not limited insofar as it is capable of intercepting the light beam. Otherwise, the shutter may be omitted, when the angle of mirror 113 can be adjusted to deflect the reflected beam reflected by beam splitter (BS), to irradiate the interference fringe pattern.

During the information reproduction operation, spatial light modulation element (SLM) 105 is employed, to intercept the light transmitting through beam splitter (BS) 104, not to travel through objective lens 108 to holographic memory disk 109. Spatial light modulation element (SLM) 105 may be the one that can produce information light with a signal of zero or one, by brightness-darkness of a liquid crystal, or by brightness-darkness formed by micro-mirror like DMD. For the interception of light, spatial light modulation element (SLM) 105 may be controlled to make a dark state by control of the liquid crystal or other micro-mirror. In another method, a shutter (not shown in the drawing) may be placed in the optical path from beam splitter (BS) 104 to objective lens 108, to intercept the light during the information reproduction. Any light-intercepting member may be employed in place of the shutter.

In the present invention, recording layer 124, in the area other than the interference fringe region, is prevented from deterioration caused by the light beam in recording and reproduction, by use of a selected recording layer, as described below. That is, the recording layer of the recording medium has a threshold to the information light beam, the recording reference light beam, and the reproducing reference light beam introduced to holographic memory disk 109. Specifically, the recording layer is formed from a photopolymer, a photo-reactive material, or a thermoplastic material, and the information is recorded and reproduced by projection of a controlled quantity of light to the recording layer. Thus, the formation of the interference fringe in the recording layer is controlled. This is effective against deterioration of the recording layer.

Second Embodiment

Figure 4A:
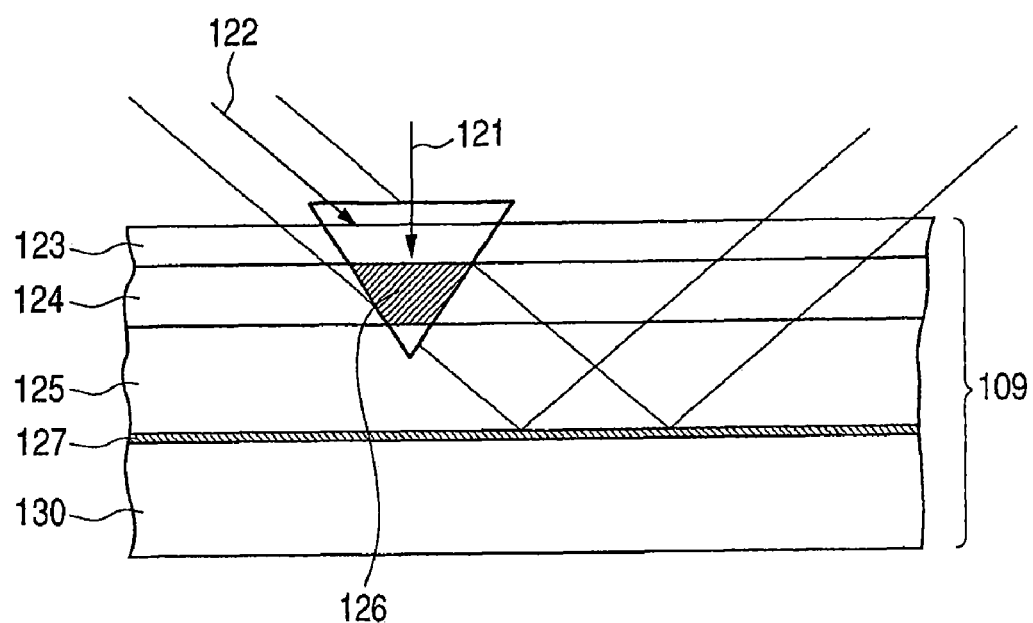
FIG. 4A and FIG. 4B illustrate the process of recording-reproduction in the Second Embodiment of the present invention.
Figure 4B:
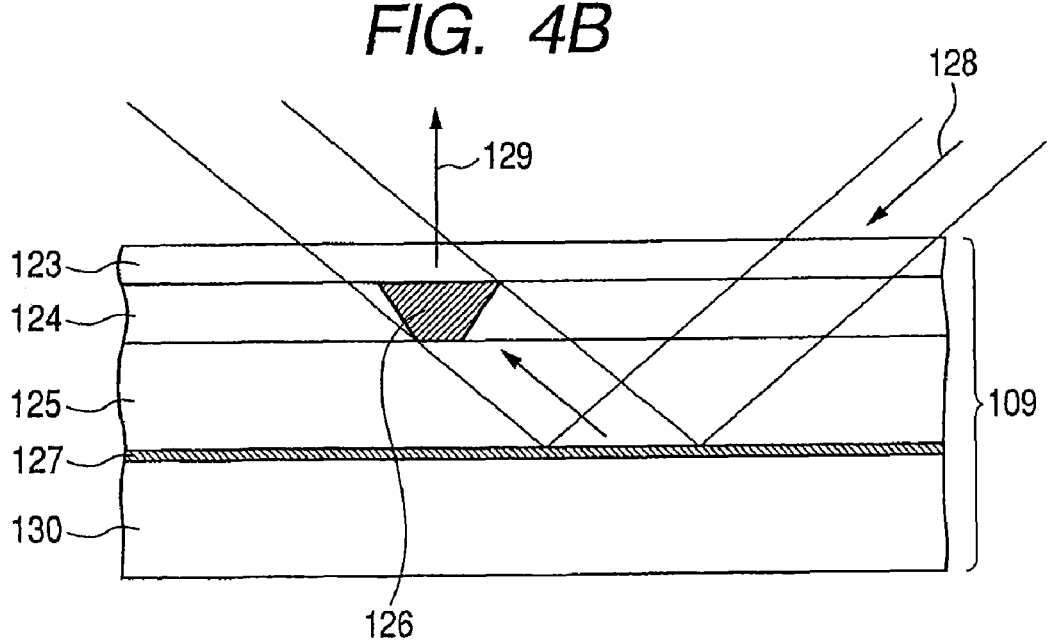

A second embodiment of the present invention is described with reference to FIGS. 4A and 4B. The optical system in this Embodiment is the same as that employed in FIG. 1 and FIG. 2. Therefore, a detailed description of the optical system is omitted. In FIGS. 4A and 4B, the same symbols as those in FIGS. 3A and 3B are used to denote the corresponding members. Holographic memory disk 109 is the same as the one in the First Embodiment.

A recording operation on holographic memory disk 109 is described by reference to FIG. 4A. In this Embodiment, information light beam 121 and recording reference light beam 122 interfere with each other in recording layer 124, before reflection at reflective layer 127, to form interference fringe 126 for information recording.

Reproduction of the information from holographic memory disk 109 carrying this information is described with reference to FIG. 4B. The characteristics of this Embodiment are described below.

In FIG. 4B, reproducing reference light beam 128 is introduced from the upper right side, and allowed to penetrate through cover layer 123, recording layer 124, and spacer layer 125, and is reflected at reflective layer 127. Reflected reproducing reference light beam 128 penetrates through spacer layer 125, and irradiates interference fringe 126 formed in recording layer 124, to generate reproduced light beam 129, which is emitted from interference fringe 126.

Reproduced light beam 129 penetrates through cover layer 123 and leaves holographic memory disk 109. Reproduced light beam 129 penetrates objective lens 108, and so forth, and is reflected by polarized light beam splitter (PBS) 106, forming an image on light receiving element 120 in the same manner as in the First Embodiment. The information is reproduced from the output of light receiving element 120. Characteristically, reproducing reference light beam 128 is introduced to interference fringe 126 in the recording layer, in the direction exactly reverse to the projection direction of recording reference light beam 122 shown in FIG. 4A. That is, the reproducing reference light beam is introduced at an angle of 180° to recording reference light beam 122. Thereby, noise can be decreased, which may be generated when the recording reference light beam 122 and reproducing reference light beam 128 are introduced in the same direction. The optical axis of reproducing reference light beam 128 coincides preferably with the optical axis of recording reference light beam 122. However, even when the two optical axes do not coincide precisely, the reproduction can be conducted with the light beam having the beam diameter sufficient for irradiating the interference fringe.

As described above, in the Second Embodiment, in which reproducing reference light beam 128 is reflected at reflective layer 127 before penetration through interference fringe 126, noise can be decreased to be lower than that in the First Embodiment, in which reproducing reference light beam 128 is reflected at reflective layer 127 after penetration through interference fringe 126.

In the above First Embodiment, being different from this Second Embodiment, reproducing reference light beam 128, on penetrating the interference fringe 126, can cause light diffraction in the direction of introduction of information light beam 121 from interference fringe 126 toward reflective layer 127. This diffracted light can be reflected at the reflective layer 127, and can also pass through interference fringe 126, to cause noise overlapping with the reproduced light beam, to lower the obtained signal quality.

On the other hand, in this Second Embodiment, reproducing reference light beam 128 is first reflected by reflective layer 127 and passes through interference fringe 126. Therefore, diffraction light is generated less in interference fringe 126 toward reflective layer 127, in comparison with the First Embodiment.

According to the present invention, recording and reproduction of information is conducted with a reflection type hologram recording medium by a two-beam interference system. Therefore, the optical system for recording and reproduction is placed in integration on one side of the hologram recording medium, whereby, the apparatus can be made smaller in thickness and smaller in size.

Third Embodiment

Figure 5A:
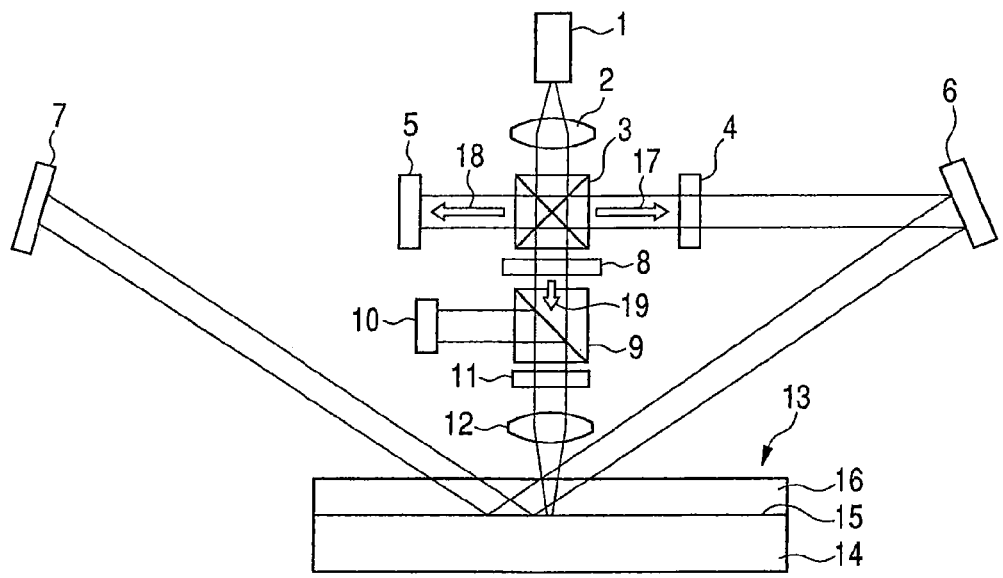
FIG. 5A and FIG. 5B illustrate the constitution of the optical information recording-reproduction apparatus of the Third Embodiment of the present invention.
Figure 5B:
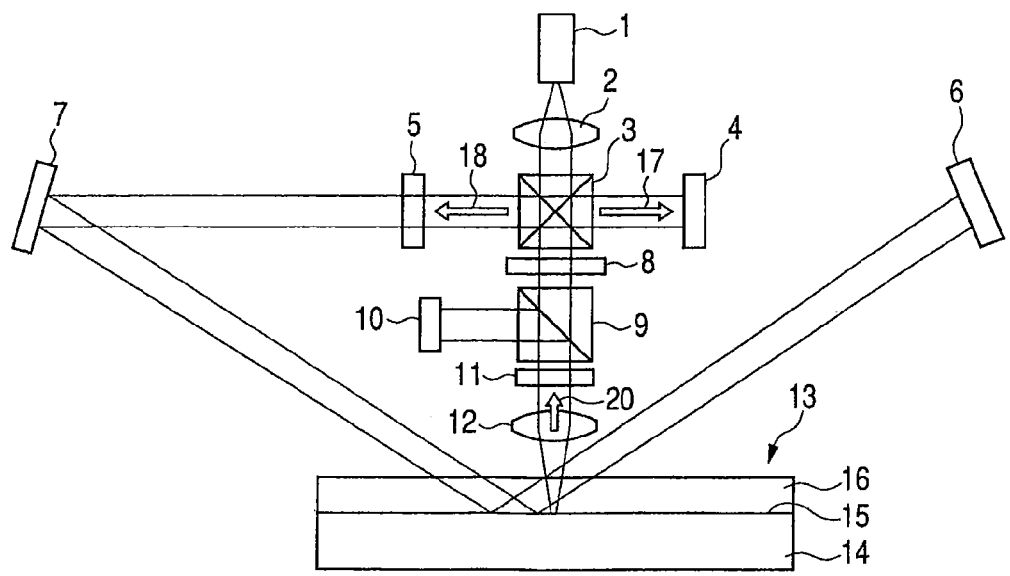

FIGS. 5A and 5B illustrate the Third Embodiment of the optical information recording-reproducing apparatus of the present invention. FIGS. 5A and 5B illustrate only the constitution of the optical system for recording and reproduction of information, without illustrating the circuits for recording or reproducing information on or from the recording medium, and the servo control system for performing focus control and tracking control. In FIGS. 5A and 5B, also omitted are the circuits and mechanism of the controller for controlling the entire apparatus, motors for rotating the recording medium, and so forth. These members are also omitted in the following Embodiments and from the respective drawings.

In this Embodiment, cross-prism 3 is used, which branches the light beam emitted from laser beam source 1 into three branched beams. Cross-prism 3 has two semi-transmissive reflective layers crossing with each other, and branches the introduced light beam into two reflected light beams in different directions and one transmitted light beam, projecting the respective branched light beams as a recording reference light beam, a reproducing reference light beam, and a recorded information light beam, onto recording medium 13.

The Third Embodiment of the present invention is described below with reference to FIGS. 5A and 5B. The light beam emitted from laser beam source 1 is converted to a parallel ray beam by collimator lens 2, and is introduced into cross-prism 3. Cross-prism 3 branches the introduced light beam into three beams: two reflected light beams in two directions, and a transmitted light beam.

The two reflected light beams are utilized respectively as recording reference light beam 17 and reproducing reference light beam 18. The transmitted light beam is spatially modulated, as mentioned later, and is utilized as recorded information light beam 19. Recording reference light beam 17 and reproducing reference light beam 18 are selectively projected onto recording medium 13 by opening first shutter 4 or second shutter 5.

First, a process for recording an information signal is described with reference to FIG. 5A. In the recording, first shutter 4 is opened with second shutter 5 kept closed, whereby, of the reference light beams, recording reference light beam 17 only passes through first shutter 4, and is reflected by first movable mirror 6, and strikes recording medium 13. In FIGS. 5A and 5B, the driving mechanism and other accessories are omitted.

The light beam, after penetration through cross-prism 3, travels to transmission type spatial light modulation element 8, and is spatially modulated in accordance with information signals into recorded information light beam 19. This recorded information light beam 19 travels through polarized beam splitter 9, quarter wavelength plate 11, and objective lens 12, successively, to focus on recording medium 13.

Recording medium 13 employed in this Embodiment is constituted of substrate 14, reflective layer 15 formed thereon, and recording layer 16. This recording layer 16 is formed from a material, which has a refractive index that is changeable by light irradiation. In recording layer 16, recorded information light beam 19 and recording reference light beam 17, when introduced together, meet and interfere with each other, to form an interference fringe, by change of the refractive index in the recording layer to give a hologram.

Multiple recording can be conducted on one and the same site on recording medium 13 by changing the projection angle of recording reference light beam 17 onto recording medium 13 in multiple levels by driving first movable mirror 6. During the recording, recording reference light beam 17 can be reflected undesirably by recording medium 13 as stray light into the optical path of recording reference light beam 17, to be introduced again to recording medium 13. This is preferably prevented by driving second movable mirror 7, or a like procedure, not to affect the recording adversely.

Next, a process for reproduction of the information signal from recording medium 13 is described with reference to FIG. 5B. In the information reproduction, spatial light modulation element 8 is controlled to intercept the light beams, not to irradiate recording medium 13, first shutter 4 is closed, and second shutter 5 is opened. Thereby, of the light beams reflected by cross-prism 3, only reproducing reference light beam 18 is allowed to pass through second shutter 5, and is reflected by second movable mirror 7, to irradiate recording medium 13.

Reproducing reference light beam 18 is reflected by reflective layer 15, of recording medium 13, toward the hologram formed in recording layer 16, to generate reproduced information light beam 20. This reproduced information light beam 20 passes through objective lens 12, and quarter wavelength plate 11, and is reflected by polarized beam splitter 9 toward detection element 10. The information signal can be reproduced from the signal detected by detection element 10.

When the information signals are recorded in multiplication by changing the projection direction of recording reference light beam 17, the projection direction of reproducing reference light beam 18 is adjusted to be exactly reverse to that of recording reference light beam 17 (at an angle of 180°), by driving movable mirror 7, to reproduce an intended information signal from the multiple records of the information.

During the reproduction operation, reproducing reference light beam 18 can be reflected undesirably by recording medium 13, as stray light, into the optical path of reproducing reference light beam 18, to be introduced again to recording medium 13 undesirably. This is preferably prevented by driving first movable mirror 6, or a like procedure, not to affect the recording adversely.

Fourth Embodiment

Figure 6A:
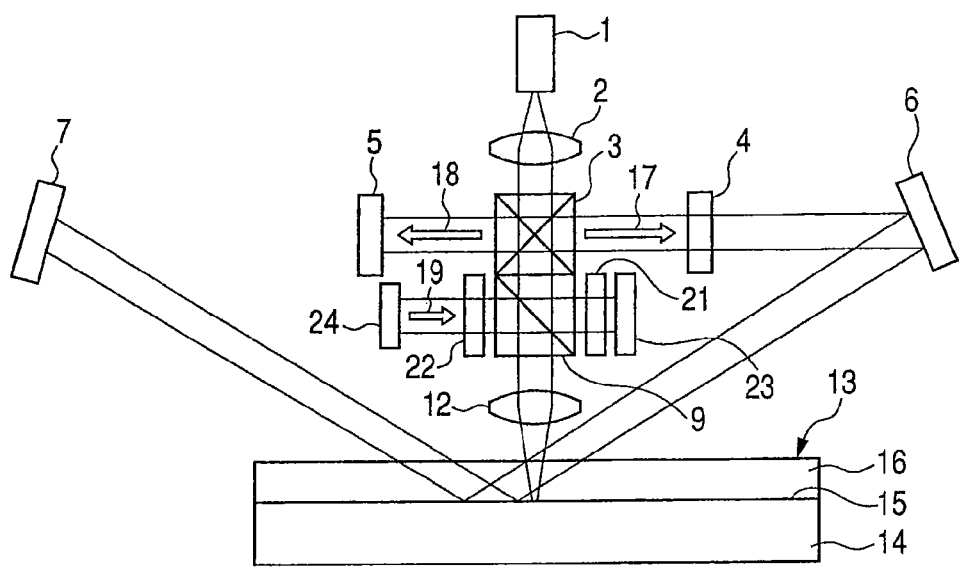
FIG. 6A and FIG. 6B illustrate the constitution of the Fourth Embodiment of the present invention.
Figure 6B:
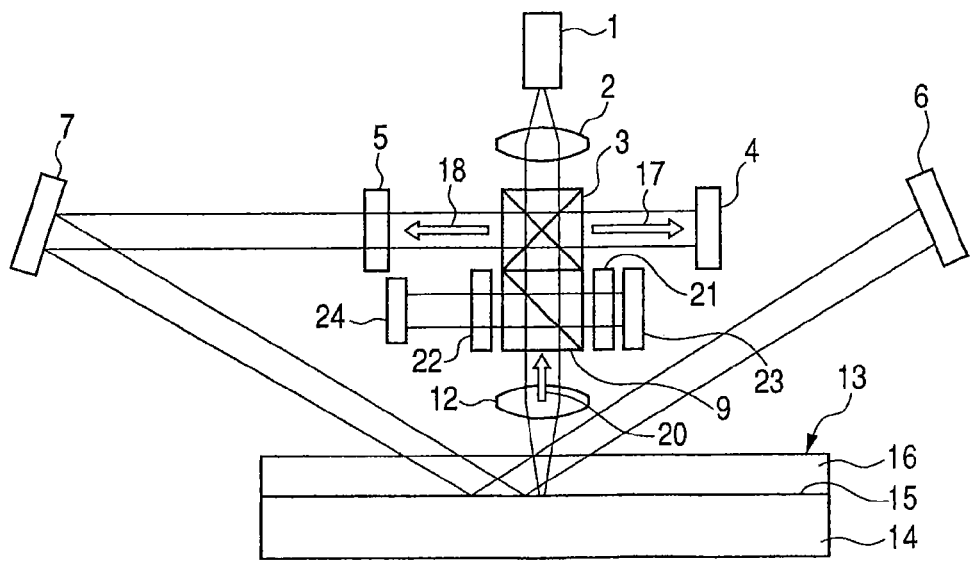

The Fourth Embodiment of the present invention is described with reference to FIGS. 6A and 6B. In FIGS. 6A and 6B, the same symbols as those in FIGS. 5A and 5B are used to denote the corresponding members. In this Embodiment, cross-prism 3 and polarizing beam splitter 9 are integrated into one body. The laser beam emitted from laser source 1 is converted to a parallel ray beam by collimator lens 2, and is introduced into cross-prism 3. Cross-prism 3 branches the introduced light beam into three beams: two reflected light beams in two directions, and a transmitted light beam.

The two reflected light beams are utilized as recording reference light beam 17 and reproducing reference light beam 18. The transmitted light beam is spatially modulated, as mentioned later, and is utilized as recorded information light beam 19. Recording reference light beam 17 and reproducing reference light beam 18 are selectively projected onto recording medium 13, by opening first shutter 4 or second shutter 5.

First, a process for recording an information signal is described with reference to FIG. 6A. In recording, first shutter 4 is opened with second shutter 5 kept closed, whereby recording reference light beam 17 only is allowed to pass through first shutter 4 and is reflected by movable mirror 6 to strike recording medium 13.

The light beam, which has penetrated through cross-prism 3, is reflected by connected polarizing beam splitter 9 and by mirror 23 to be introduced again to polarizing beam splitter 9. Between polarizing beam splitter 9 and mirror 23, first quarter wavelength plate 21 is placed to turn the direction of the linearly polarized light by 90°. Therefore, the reflected light beam from mirror 23 penetrates through polarizing beam splitter 9, and travels to the reflection type of integrated element 24 for spatial light modulation/detection.

The integrated element 24 for spatial light modulation/detection may be, for example, an integration of a reflection type of spatial light modulation element employing a liquid crystal with a CMOS type detection element.

The light beam is spatially modulated in accordance with an information signal, to be recorded by integrated element 24, for spatial light modulation/detection, and is reflected as a recorded information light beam 19, and introduced again to polarizing beam splitter 9. Between polarizing beam splitter 9 and integrated element 24 for spatial light modulation/detection, second quarter wavelength plate 22 is placed. This second quarter wavelength plate 22 turns the direction of linearly polarized light by ninety degrees. Therefore, recorded information light beam 19 is reflected by polarizing beam splitter 9, and is focused through objective lens 12 onto recording medium 13.

In recording layer 16, recorded information light beam 19 and recording reference light beam 17 meet and interfere with each other to form an interference fringe by change of the refractive index in the recording layer, giving a hologram. Multiple recording of information signals can be conducted on one and the same site in recording medium 13, by changing the projection angle of recording reference light beam 17 in multiple levels, by driving first movable mirror 6.

During the recording, recording reference light beam 17 can be reflected undesirably by recording medium 13 as stray light into the optical path of recording reference light beam 17 to be introduced again to recording medium 13. This is preferably prevented by driving second movable mirror 7, or a like procedure, not to affect adversely the recording.

Next, a process for reproduction of the information signal from recording medium 13 is described with reference to FIG. 6B. In the information reproduction, first shutter 4 is closed, and second shutter 5 is opened. Thereby, of the light beams reflected by cross-prism 3, only reproducing reference light beam 18 is allowed to pass through second shutter 5, and is reflected by second movable mirror 7 to irradiate recording medium 13.

Reproducing reference light beam 18 is reflected by reflective layer 15 toward the hologram formed in recording layer 16, whereby, reproduced information light beam 20 is produced. This reproduced information light beam 20 passes through objective lens 12, and is reflected by polarized beam splitter 9 toward integrated element 24 for spatial light modulation/detection. The information signal can be reproduced from the signal detected by integrated element 24.

During the reproduction operation, reproducing reference light beam 18 can be reflected undesirably, by recording medium 13, as stray light, into the optical path of reproducing reference light beam 18, to be introduced again to recording medium 13 undesirably. This is preferably prevented by driving first movable mirror 6, not to affect the recording adversely.

When the information signals are recorded in multiplication by changing the projection direction of recording reference light beam 17, the projection direction of reproducing reference light beam 18 is adjusted, to be exactly reverse to that of recording reference light beam 17 (at an angle of 180°), by driving second movable mirror 7 to reproduce an intended information signal from the multiple records of the information.

In the Fourth Embodiment, cross-prism 3 and polarizing beam splitter 9 are integrated into one body. This enables further miniaturization of the entire apparatus.

Fifth Embodiment

Figure 7A:
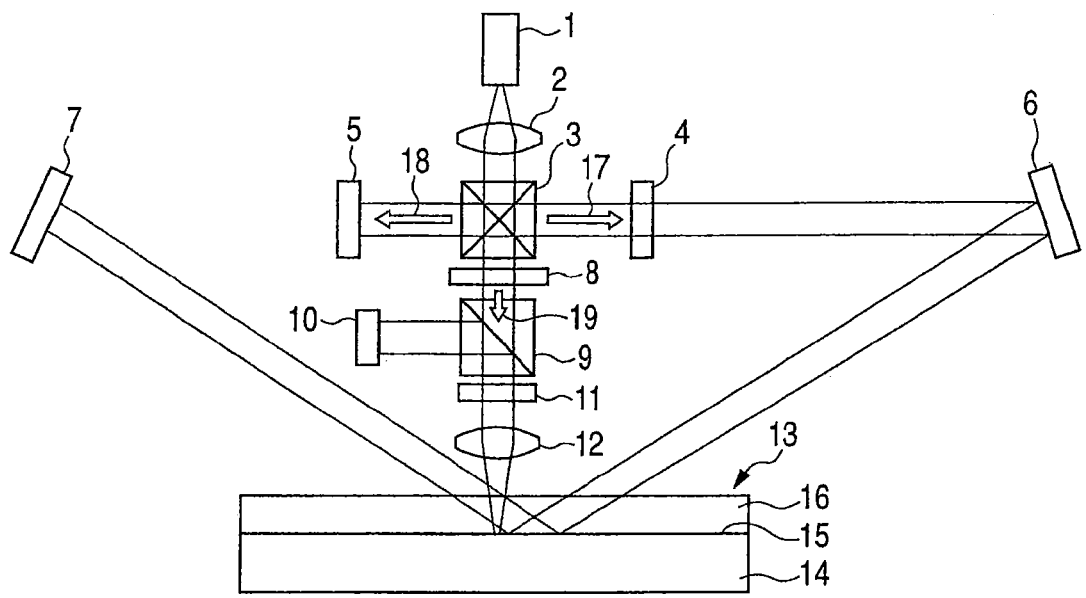
FIG. 7A and FIG. 7B illustrate the constitution of the Fifth Embodiment of the present invention.
Figure 7B:
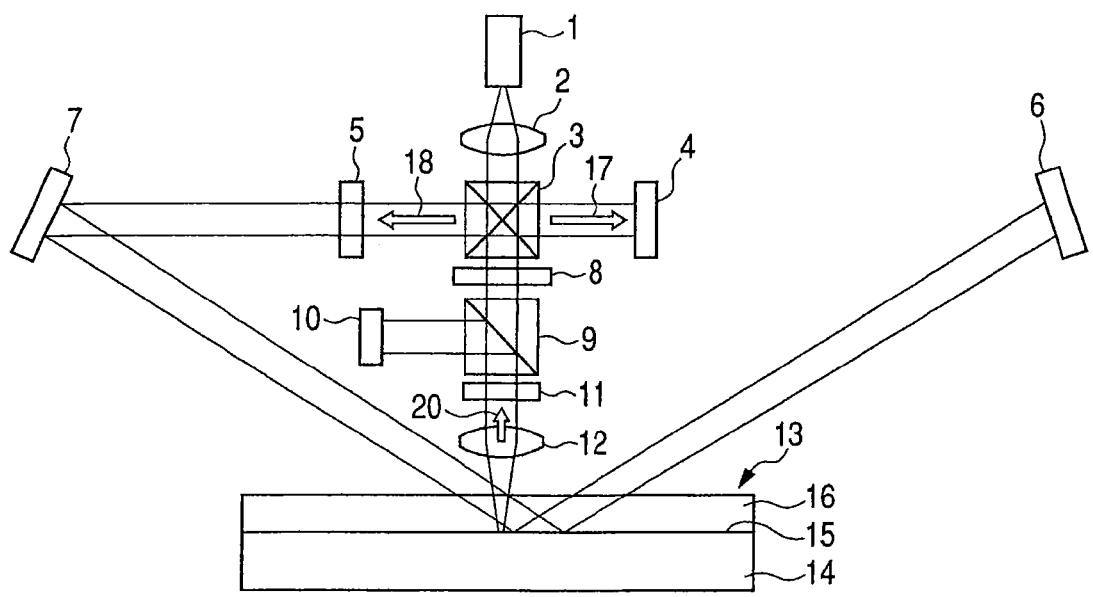

The Fifth Embodiment of the present invention is described with reference to FIGS. 7A and 7B. In FIGS. 7A and 7B, the same symbols as those in FIGS. 5A and 5B are used to denote the corresponding members.

This Embodiment is different from the Third Embodiment in that, in recording an information signal, recording reference light beam 17 is reflected by reflective layer 15 of recording medium 13, and then meets recorded information light beam 19 in recording layer 16, to cause interference and form a hologram, and in reproducing the information signal, the reproducing reference light beam 18 is projected, before reflection by reflective layer 15 of recording medium 13, onto the hologram formed in recording layer 16, to form reproduced information light beam 20.

This Embodiment is described below specifically. First, a process for recording of an information signal is described with reference to FIG. 7A. In recording, first shutter 4 is opened with second shutter 5 kept closed, whereby, of the reference light beams, recording reference light beam 17 only passes through first shutter 4, and is reflected by movable mirror 6, and strikes recording medium 13. In FIGS. 7A and 7B, shutter driving mechanisms are omitted.

The light beam, after penetration through cross-prism 3, travels to transmission type spatial light modulation element 8, and is spatially modulated in accordance with information signals into recorded information light beam 19. This recorded information light beam 19 passes through polarized beam splitter 9, quarter wavelength plate 11, and objective lens 12, successively, to focus on recording medium 13.

Recording medium 13, employed in this Embodiment, is constituted of substrate 14, reflective layer 15 formed thereon, and recording layer 16. This recording layer 16 is formed from a material, which has a refractive index that is changeable by light irradiation. Recording reference light beam 17, after reflection by reflective layer 15, meets recorded information light beam 19 and interferes with it to cause a change of the refractive index in the recording layer 16, and formation of an interference fringe, to give a hologram.

Multiple recording can be made on one and the same site on recording medium 13 by changing the projection angle of recording reference light beam 17 onto recording medium 13 in multiple levels, by driving first movable mirror 6. During the recording, recording reference light beam 17 can be reflected undesirably, by recording medium 13, as stray light into the optical path of recording reference light beam 17, to be introduced again to recording medium 13. This is preferably prevented by driving second movable mirror 7, or a like procedure, not to affect the recording adversely.

Next, a process for reproduction of the information signal from recording medium 13 is described with reference to FIG. 7B. In the information reproduction, spatial light modulation element 8 is controlled, to intercept the light beam, not to irradiate recording medium 13. First shutter 4 is closed, and second shutter 5 is opened. Thereby, of the light beams reflected by cross-prism 3, only reproducing reference light beam 18 is allowed to pass through second shutter 5, and is reflected by second movable mirror 7 to irradiate recording medium 13.

Reproducing reference light beam 18 is projected onto the hologram formed in recording layer 16, before reflection by reflective layer 15, whereby, reproduced information light beam 20 is produced. This reproduced information light beam 20 is allowed to pass through objective lens 12, quarter wavelength plate 11, and is reflected by polarized beam splitter 9 toward detection element 10. The information signal can be reproduced from the signals detected by detection element 10.

When the information signals are recorded in multiplication by changing the projection direction of recording reference light beam 17, the projection direction of reproducing reference light beam 18 is adjusted to be exactly reverse to that of recording reference light beam 17 (at an angle of 180°), by driving second movable mirror 7 to reproduce an intended information signal from the multiple records of the information.

During the reproduction operation, reproducing reference light beam 18 can be reflected undesirably by recording medium 13, as stray light, into the optical path of reproducing reference light beam 18, to be introduced again to recording medium 13 undesirably. This is preferably prevented by driving first movable mirror 6, not to affect the recording adversely.

Sixth Embodiment

Figure 8A:
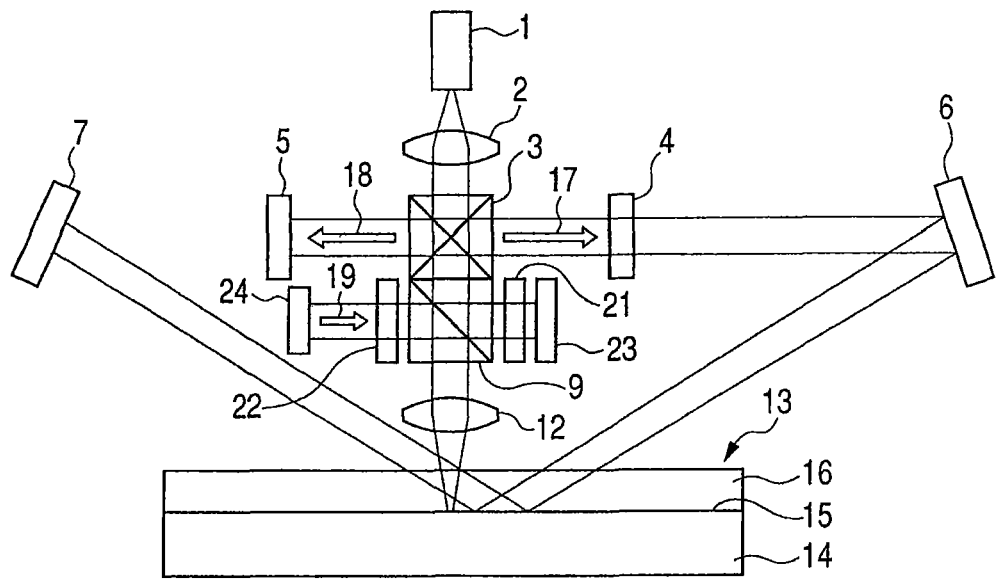
FIG. 8A and FIG. 8B illustrate the constitution of the Sixth Embodiment of the present invention.
Figure 8B:
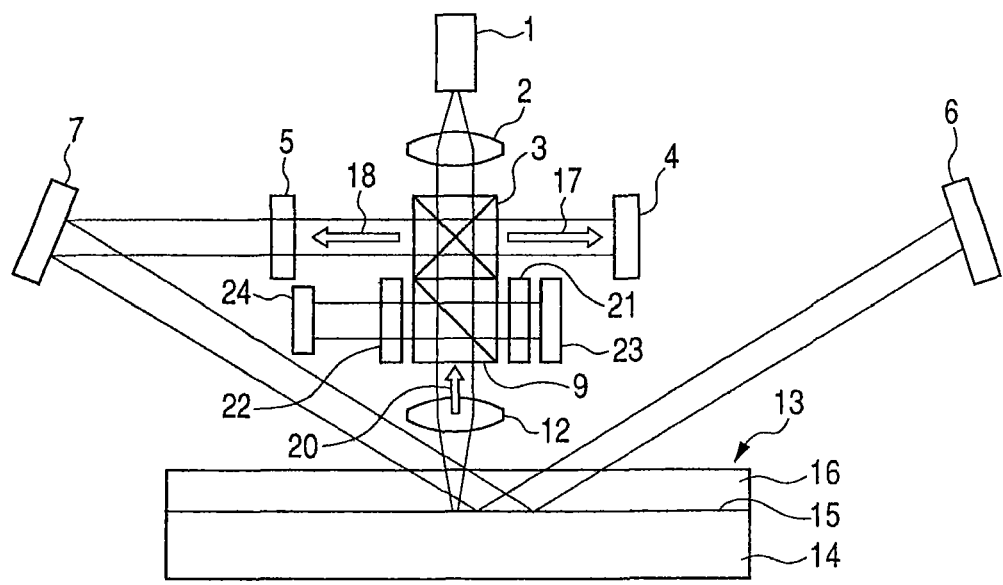
Figure 9:
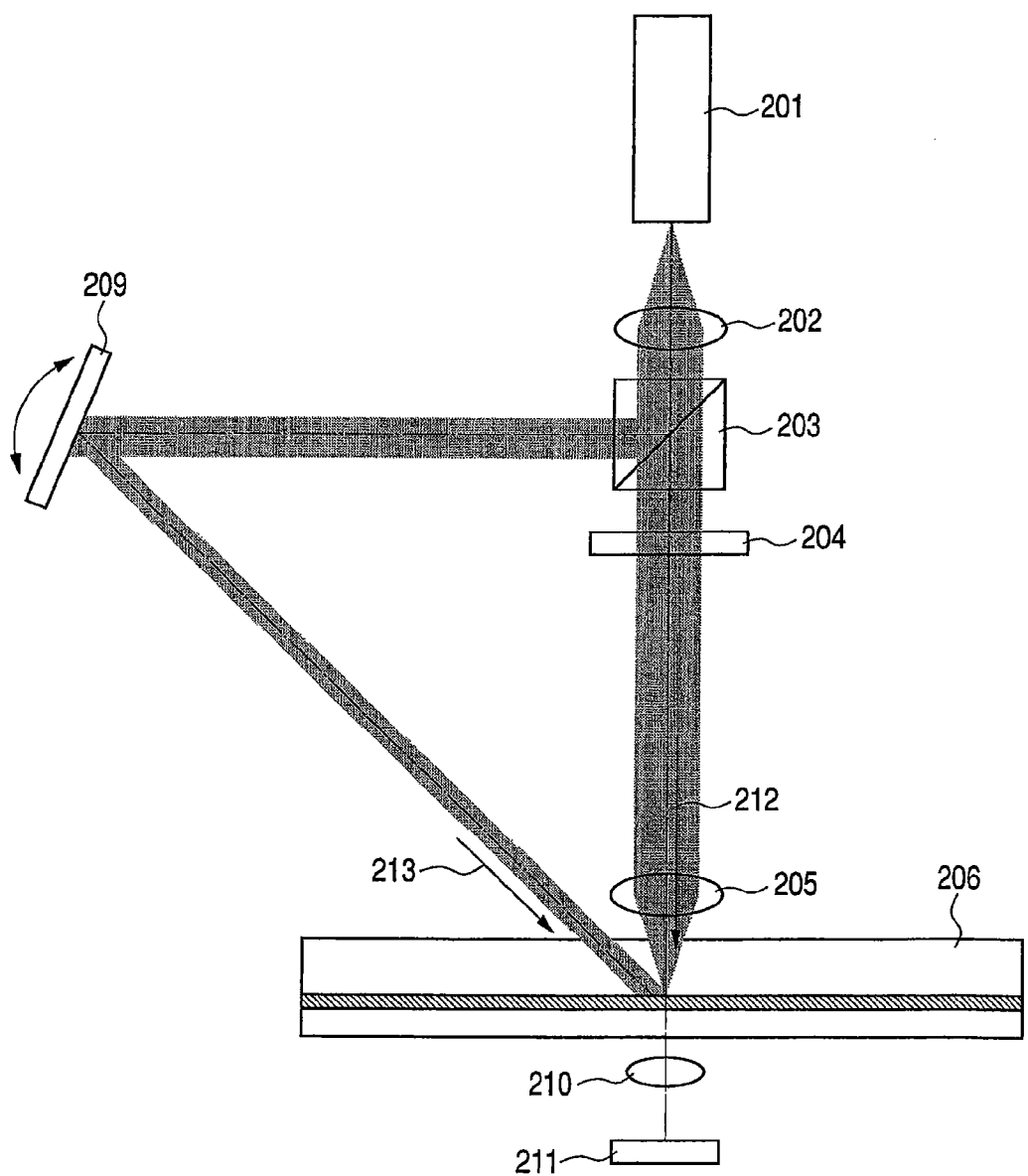
FIG. 9 schematically illustrates an optical system for performing information recording by a conventional technique.
Figure 10:
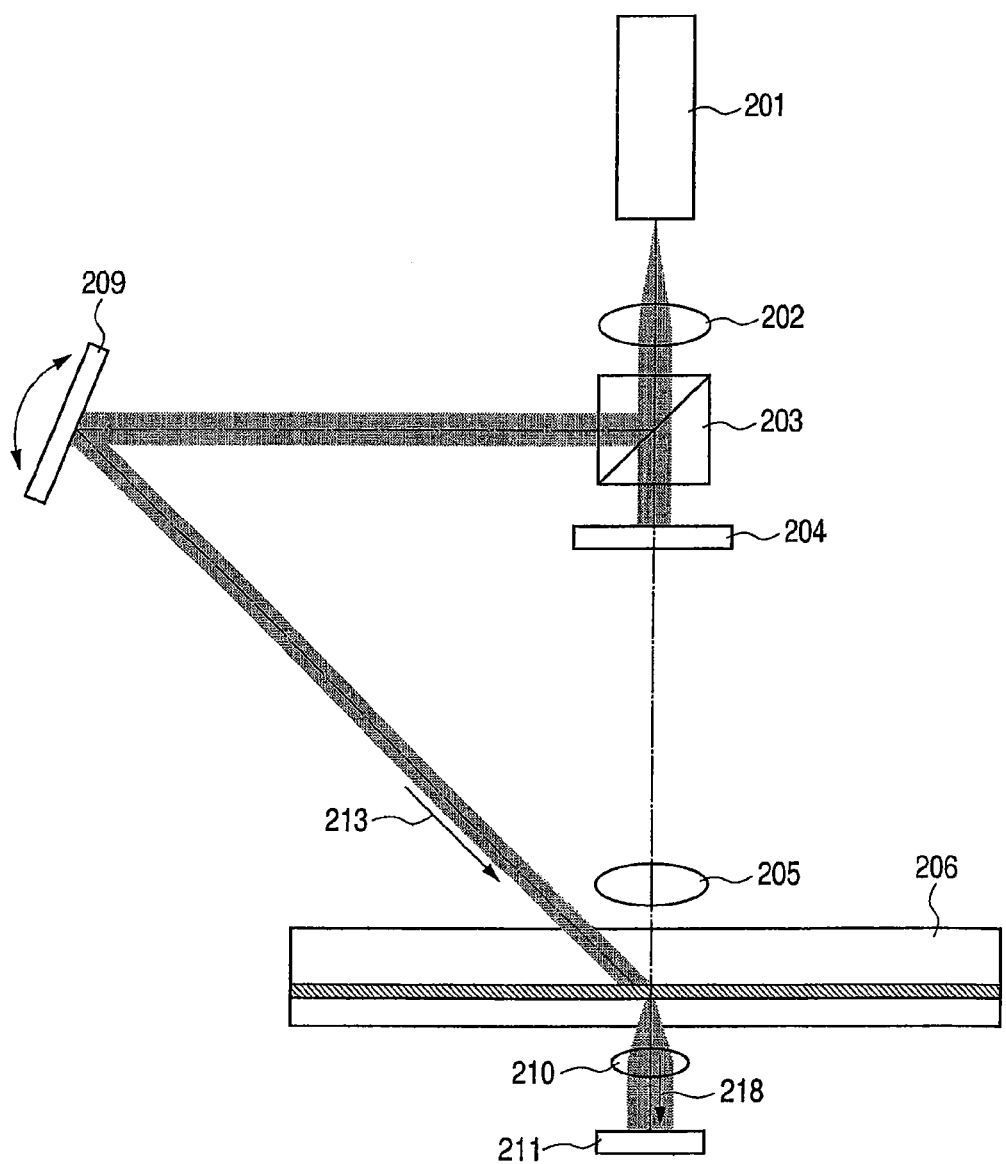
FIG. 10 schematically illustrates an optical system for performing information reproduction by a conventional technique.
Figure 11A:
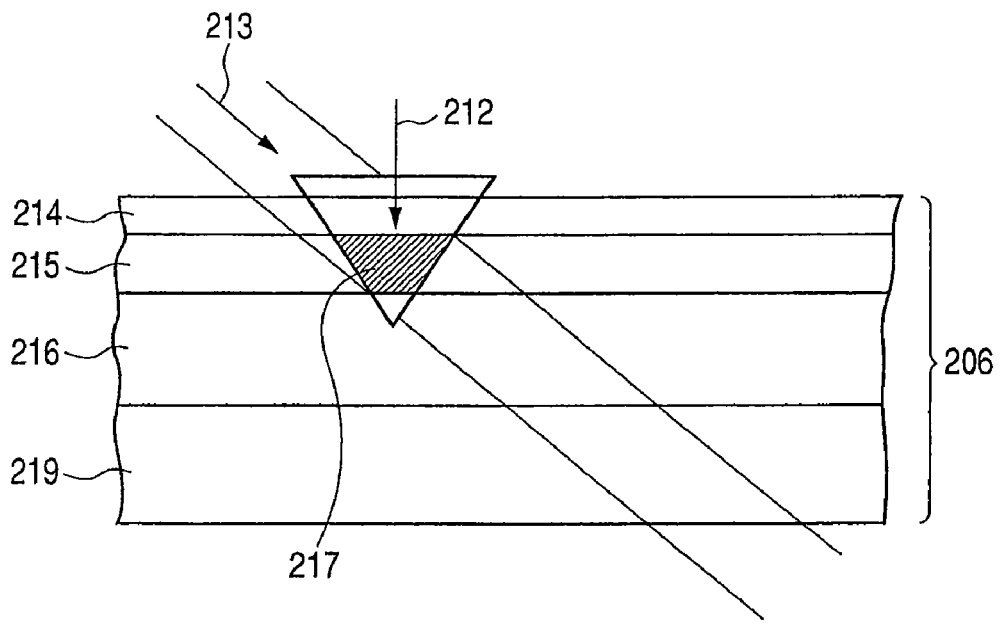
FIG. 11A and FIG. 11B illustrate a process of recording-reproduction by a conventional technique.
Figure 11B:
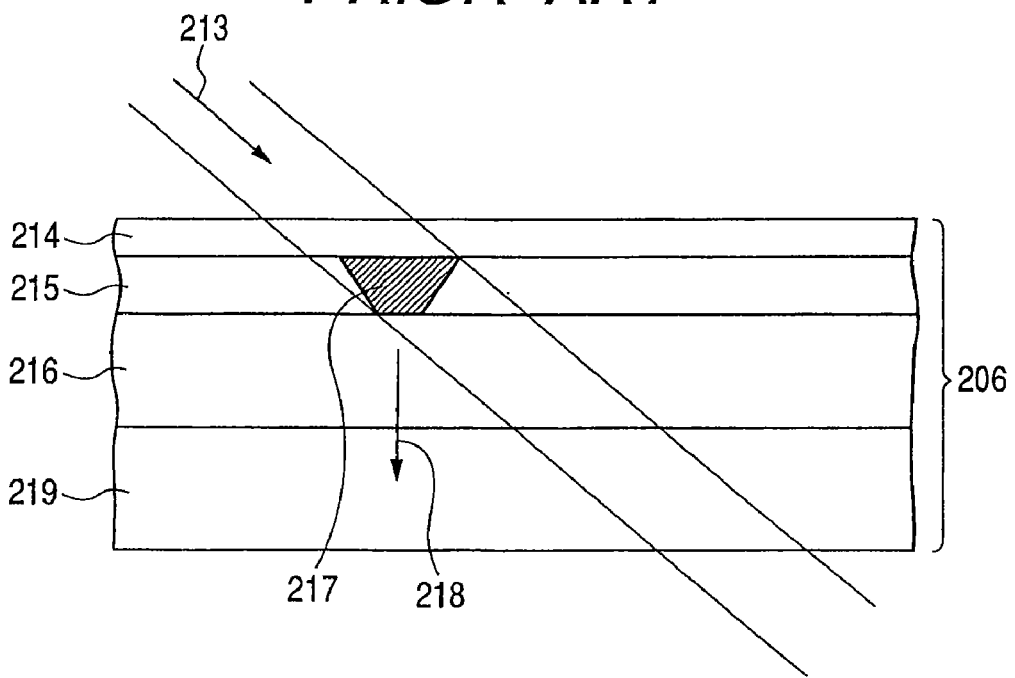

The Sixth Embodiment of the present invention is described with reference to FIGS. 8A and 8B. In FIGS. 8A and 8B, the same symbols as those in FIGS. 6A and 6B are used to denote the corresponding members.

This Embodiment is different from the Fourth Embodiment in that, in recording an information signal, recording reference light beam 17 is reflected by reflective layer 15 of recording medium 13, and then, meets recorded information light beam 19 in recording layer 16, to cause interference and form a hologram, and in reproducing the information signal, the reproducing reference light beam 18 is projected, before reflection by reflective layer 15 of recording medium 13, onto the hologram formed in recording layer 16, to form reproduced information light beam 20.

This Embodiment is described below specifically. First, a process for recording of an information signal is described with reference to FIG. 8A. In recording, first shutter 4 is opened with second shutter 5 kept closed, whereby, of the reference light beams, recording reference light beam 17 only passes through first shutter 4, and is reflected by movable mirror 6, and irradiates recording medium 13.

The light beam that has penetrated through cross-prism 3 is reflected by connected polarizing beam splitter 9, and by mirror 23, to be introduced again to polarizing beam splitter 9. Between polarizing beam splitter 9 and mirror 23, first quarter wavelength plate 21 is placed, to turn the direction of the linearly polarized light by 90°. Therefore, the reflected light beam mirror 23 penetrates through polarizing beam splitter 9, and travels to the reflection type of integrated element 24, for spatial light modulation/detection.

The integrated element 24 for spatial light modulation/detection may be, for example, an assemblage containing a reflection type of spatial light modulation element employing a liquid crystal and a CMOS type detection element in integration.

The light beam is spatially modulated in accordance with an information signal to be recorded by integrated element 24 for spatial light modulation/detection and is reflected as recorded information light beam 19, and is projected again to polarizing beam splitter 9. Between polarizing beam splitter 9 and integrated element 24 for spatial light modulation/detection, second quarter wavelength plate 22 is placed. This second quarter wavelength plate 22 turns the direction of linearly polarized light by ninety degrees. Therefore, recorded information light beam 19 is reflected by polarizing beam splitter 9, and is focused by objective lens 12 onto recording medium 13.

In recording layer 16, recording reference light beam 17 is reflected by reflective layer 15 and comes to meet and interfere with information-recording reference light beam 19 to form an interference fringe by a change of the refractive index in recording layer 16, giving a hologram. Multiple recording of information signals can be conducted on one and the same site in recording medium 13, by changing the projection angle of recording reference light beam 17 in multiple levels, by driving first movable mirror 6.

During the recording, recording reference light beam 17 can be reflected undesirably by recording medium 13, as stray light, into the optical path of recording reference light beam 17, to be introduced again to recording medium 13. This is preferably prevented by driving second movable mirror 7, or a like procedure, not to affect the recording adversely.

Next, a process for reproduction of the information signal from recording medium 13 is described with reference to FIG. 8B. In the information reproduction, first shutter 4 is closed, and second shutter 5 is opened. Thereby, of the light beams reflected by cross-prism 3, only reproducing reference light beam 18 is allowed to pass through second shutter 5, and is reflected by second movable mirror 7, to irradiate recording medium 13.

Reproducing reference light beam 18 is projected onto the hologram formed in recording layer 16, before reflection by reflective layer 15, whereby reproduced information light beam 20 is produced. This reproduced information light beam 20 is allowed to pass through objective lens 12, and is reflected by polarized beam splitter 9 toward integrated element 24, for spatial light modulation/detection. The information signal can be reproduced from the signal detected by integrated element 24.

During the reproduction operation, reproducing reference light beam 18 can be reflected undesirably by recording medium 13, as stray light, into the optical path of reproducing reference light beam 18, to be introduced again to recording medium 13. This is preferably prevented by driving first movable mirror 6, not to affect adversely the recording.

When the information signals are recorded in multiplication by changing the projection direction of recording reference light beam 17, the projection direction of reproducing reference light beam 18 is adjusted to be exactly reverse to that of recording reference light beam 17 (at an angle of 180°) by driving second movable mirror 7, to reproduce an intended information signal from the multiple records of the information.

In the Sixth Embodiment, cross-prism 3 and polarizing beam splitter 9 are integrated into one body, similarly, as in the Fourth Embodiment, which enables further miniaturization of the entire apparatus.

The present invention is also applicable to performing recording and reproduction with a transmission type recording medium, which does not have reflective layer 15. However, in such a case, the reproducing reference light beam is projected from the side reverse to the recording reference light beam projection for information signal recording, and a part of the optical system, such as the second movable mirror, is placed on the opposite side of recording medium 13.

However, with the recording medium 13 having reflective layer 15, the reproducing reference light beam and the recording reference light beam are projected on the same face side of the recording medium, so that the entire of the optical system is placed on the same side of the recording medium face, which enables further miniaturization of the apparatus.

In the above Third to Sixth Embodiments, the light beam is branched by one cross-prism into three beams, without employing two beam splitters, which enables further miniaturization of the apparatus.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalents structures and functions.

What is claimed is:

1. A process for effecting at least one of recording of information on and reproducing of information from a reflection-type holographic information recording medium, which includes a reflecting layer, said process comprising:
　(a) for effecting recording of information on the recording medium:
　　(i) branching a light beam from a light source into a first branched light beam and a second branched light beam;
　　(ii) forming an information light beam from the first branched light beam by modulation with a spatial light modulation element; and
　　(iii) recording the information by forming an interference fringe by projecting the second branched light beam as a recording reference light beam together with the information light beam onto the reflection type recording medium; and
　(b) for effecting reproducing of information from the recording medium:

(i) projecting a light beam from the light source as a reproducing reference light beam onto the interference fringe, wherein an angle of incidence of the recording reference light beam into the interference fringe and an angle of incidence of the reproducing reference light beam into the interference fringe are one hundred eighty degrees from one another.

2. The process according to claim 1, further comprising:

reflecting the recording reference light beam by the reflecting layer after forming the interference fringe; and irradiating the interference fringe with the reproducing reference light beam having been reflected by the reflecting layer.

3. The process according to claim 1, further comprising:

reflecting the recording reference light beam by the reflecting layer to cause the reflected recording reference light beam to interfere with the information light beam to form the interference fringe; and reflecting the reproducing reference light beam by the reflecting layer after the reproducing reference light beam passes through the interference fringe.

* * * * *